(12) United States Patent
Fulks et al.

(10) Patent No.: US 9,092,897 B2
(45) Date of Patent: Jul. 28, 2015

(54) METHOD AND APPARATUS FOR DISPLAYING INTERFACE ELEMENTS

(75) Inventors: Mark Fulks, Danville, CA (US); Gabriel Nava-Vazquez, Campbell, CA (US); Pankaj Jain, San Jose, CA (US); Sreejumon Kundilepurayil, Cupertino, CA (US); Andre Tadeu Santos Fialho, Berlin (DE); Christophe Marle, San Francisco, CA (US); Kenneth Walker, Concord, CA (US); Adetokunbo Bamidele, Dublin, CA (US); Franklin Ashley Lyons, San Antonio, TX (US)

(73) Assignee: Here Global B.V., Veldhoven (NL)

( * ) Notice: Subject to any disclaimer, the term of this patent is extended or adjusted under 35 U.S.C. 154(b) by 282 days.

(21) Appl. No.: 13/572,131

(22) Filed: Aug. 10, 2012

(65) Prior Publication Data

US 2014/0043322 A1 Feb. 13, 2014

(51) Int. Cl.

| | |
|---|---|
| G06T 19/00 | (2011.01) |
| G06T 19/20 | (2011.01) |
| G06T 15/20 | (2011.01) |
| G06F 3/147 | (2006.01) |
| G09G 3/00 | (2006.01) |

(52) U.S. Cl.
CPC ............ *G06T 19/006* (2013.01); *G06F 3/147* (2013.01); *G09G 3/003* (2013.01); *G09G 2354/00* (2013.01)

(58) Field of Classification Search
CPC ... G06T 19/006; G06T 15/20; G06F 17/3087; G06F 17/30241; G06F 17/30041; H04W 4/02; H04W 64/00; G06Q 30/0261; G06Q 50/01
See application file for complete search history.

(56) References Cited

U.S. PATENT DOCUMENTS

| | | | | |
|---|---|---|---|---|
| 2009/0319175 | A1* | 12/2009 | Khosravy et al. | ............. 701/206 |
| 2012/0176525 | A1* | 7/2012 | Garin et al. | ............. 348/333.02 |
| 2012/0194547 | A1* | 8/2012 | Johnson et al. | ............... 345/632 |

* cited by examiner

*Primary Examiner* — Tize Ma
(74) *Attorney, Agent, or Firm* — Alston & Bird LLP

(57) ABSTRACT

A method, apparatus and computer program product are provided to provide an efficient, aesthetically pleasing display of points of interest in an AR interface that maximizes usability and display efficiency. In this regard, the method, apparatus and computer program product may utilize a mobile terminal to perform pre-processing of interface elements to reduce display clutter and increase efficiency of display processing. Interface elements may be projected onto a cylindrical surface to locate the interface elements relative to the mobile terminal. Three dimensional coordinates for the interface elements may be derived from the cylindrical projection. A perspective grid may provide a user of the device with a frame of reference to interact with the display and interface elements displayed thereon. Display elements may further conform to input operations performed by a user to interact with the AR interface.

20 Claims, 12 Drawing Sheets

700

METHOD AND APPARATUS FOR DISPLAYING INTERFACE ELEMENTS

TECHNOLOGICAL FIELD

An example embodiment of the present invention relates generally to augmented reality displays and, more particularly, to displaying location-based points of interest via an augmented reality display.

BACKGROUND

Advances in technology have allowed for increasingly complex features to be integrated into mobile terminals. Features such as video cameras, location information systems, compasses, gyroscopes, and accelerometers are capable of leveraging the communication capabilities of mobile terminals such as cellular phones, personal digital assistants (PDAs), and smartphones to provide users with unprecedented levels of information. One such way of providing information to a user is via the use of an augmented reality (AR) display. Such displays typically receive and display image data from an image capture device or a video capture device (e.g., a video camera coupled to the mobile terminal) and modify or overlay the image data to impart additional information to the user. For example, an AR display might use compass readings, an internal gyroscope, and an image of a night sky to overlay the night sky with the names of particular constellations. Another AR display might overlay a user's travel route to a destination over a view of a city street to direct the user.

One use of AR displays provides information about nearby points of interest to a user by overlaying icons representing the points of interest (POI) on a video display of the environment. These points of interest are typically displayed on the screen as graphical objects projected by a processor. Efficient display of these points of interest requires careful placement of objects to minimize screen clutter while still presenting the graphical objects in an intuitive manner that allows for ease of interaction.

BRIEF SUMMARY

A method, apparatus and computer program product are therefore provided according to an example embodiment of the present invention in order to provide an efficient display of points of interest in an AR interface that maximizes usability and display efficiency. In this regard, the method, apparatus and computer program product of an example embodiment may utilize a mobile terminal to perform pre-processing of interface elements to reduce display clutter and increase efficiency of display processing. Interface elements may be projected onto a cylindrical surface to locate the interface elements relative to the mobile terminal. Three dimensional coordinates for the interface elements may be derived from the cylindrical projection. A perspective grid may provide a user of the device with a frame of reference to interact with the display and interface elements displayed thereon. Display elements may further conform to input operations performed by a user to interact with the AR interface.

Example embodiments of the invention may provide a method. The method may include determining a first location, receiving a second location, determining, using a processor, a bearing angle and a distance from the mobile terminal to the point of interest using the first location and the second location, projecting the point of interest onto a cylinder using the bearing and distance, determining a set of three dimensional coordinates in a Cartesian space for the point of interest relative to the mobile terminal using the projected point of interest, displaying the point of interest as an interface element of an augmented reality interface using the set of three dimensional coordinates in a Cartesian space. The first location may correspond to the location of a mobile terminal. The second location may correspond to the location of a point of interest. The method may also include determining a heading of the mobile terminal, and using the heading to determine whether the point of interest is visible in a display of the mobile terminal prior to displaying the point of interest. The method may further include determining one or more view port settings for displaying a portion of the cylinder on a display of the mobile terminal, and using the one or more view port settings to display a portion of the cylinder including the point of interest on the display. The view port settings may include at least one of a view port width in pixels, a view port height in pixels, a horizontal view port camera angle of view, and a vertical view port camera angle of view. The view port settings may also define the portion of the cylinder that corresponds to the viewing angle of a camera coupled to the mobile terminal. The method may also include scaling the interface element based on the distance from the mobile terminal to the point of interest associated with the interface element. The method may further include determining a horizon based on input from one or more attitude sensors coupled to the mobile terminal, and adjusting display of the point of interest based on the location of the point of interest relative to the horizon. The height of the point of interest on the cylinder may be based on the distance between the point of interest and the mobile terminal.

Example embodiments of the invention may further include an apparatus comprising at least one processor and at least one memory including computer program instructions. The at least one memory and the computer program instructions may be configured to, with the at least one processor, cause the apparatus at least to determine a first location, receive a second location, determine a bearing angle and a distance from the apparatus to a point of interest using the first location and the second location, project the point of interest onto a cylinder using the bearing and distance, determine a set of three dimensional coordinates in a Cartesian space for the point of interest relative to the apparatus using the projected point of interest, and display the point of interest as an interface element of an augmented reality interface using the set of three dimensional coordinates in a Cartesian space. The second location may correspond to the location of the point of interest. The apparatus may be further configured to determine a heading of the apparatus, and determine, using the heading, whether the point of interest is visible in a display of the apparatus prior to displaying the point of interest. The apparatus may also be configured to determine one or more view port settings for displaying a portion of the cylinder on a display of the apparatus, and use the one or more view port settings to display a portion of the cylinder including the point of interest on the display. The view port settings may include at least one of a view port width in pixels, a view port height in pixels, a horizontal view port camera angle of view, and a vertical view port camera angle of view. The view port settings may define the portion of the cylinder that corresponds to the viewing angle of a camera coupled to the apparatus. The apparatus may be further configured to scale the interface element based on the distance from the apparatus to the point of interest associated with the interface element. The apparatus may further include one or more attitude sensors. The apparatus may be further configured to determine a horizon based on input from one or more attitude sensors coupled to the mobile terminal, and adjust display of the point of interest based on the location of the point of interest relative to the horizon. The height of the point of interest on the cylinder may be based on the distance between the point of interest and the apparatus.

Example embodiments of the invention may further include a computer program product including at least one non-transitory computer-readable storage medium bearing computer program instructions embodied therein for use with a computer. The computer program instructions may include program instructions configured to determine a first location, receive a second location, determine a bearing angle and a distance from the mobile terminal to the point of interest using the first location and the second location, project the point of interest onto a cylinder using the bearing and distance, determine a set of three dimensional coordinates in a Cartesian space for the point of interest relative to the mobile terminal using the projected point of interest, and display the point of interest as an interface element of an augmented reality interface using the set of three dimensional coordinates in a Cartesian space. The first location may correspond to the location of a mobile terminal. The second location may correspond to the location of a point of interest. The program instructions may be further configured to determine a heading of the mobile terminal, and use the heading to determine whether the point of interest is visible in a display of the mobile terminal prior to displaying the point of interest. The program instructions may be further configured to determine one or more view port settings for displaying a portion of the cylinder on a display of the mobile terminal, and use the one or more view port settings to display a portion of the cylinder including the point of interest on the display. The view port settings may comprise at least one of a view port width in pixels, a view port height in pixels, a horizontal view port camera angle of view, and a vertical view port camera angle of view.

BRIEF DESCRIPTION OF THE DRAWINGS

Figure 1:
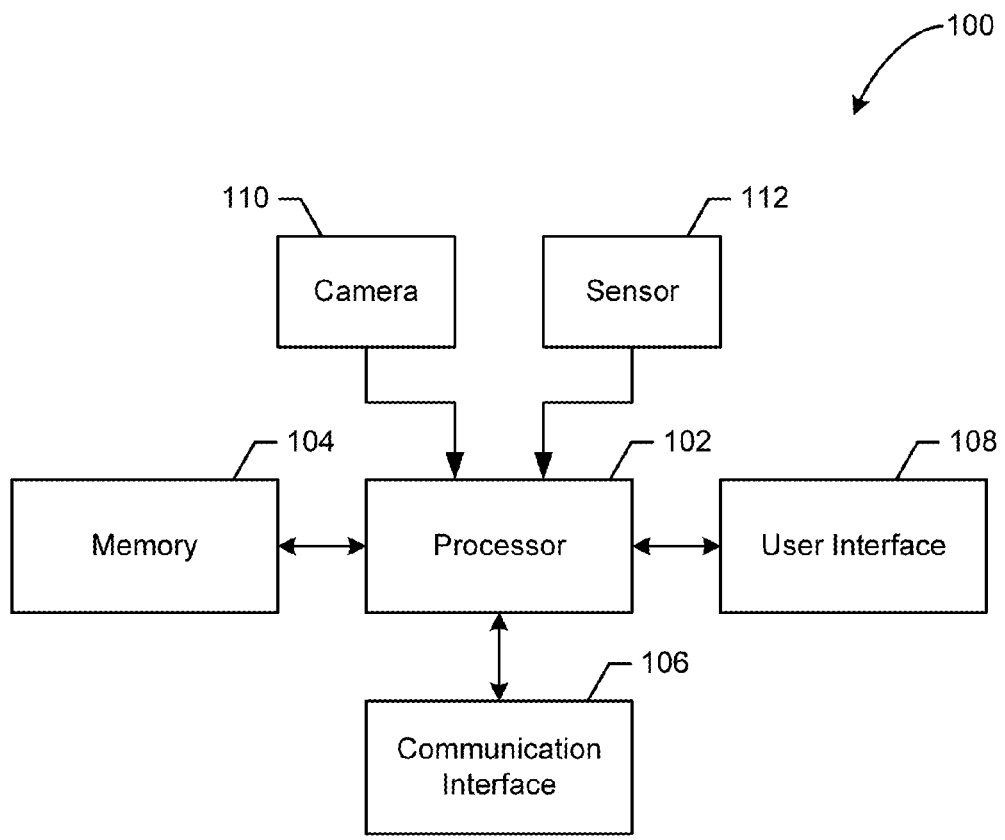
Figure 2:
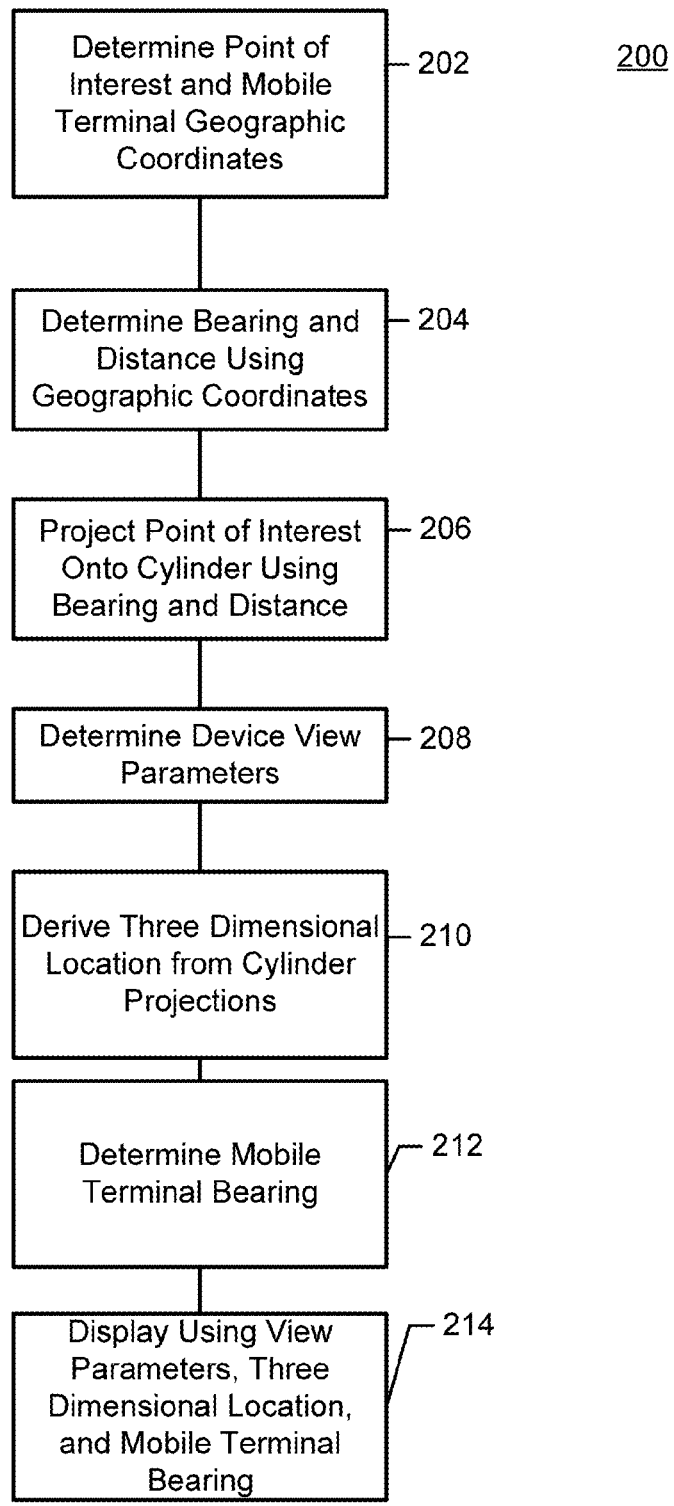
Figure 3:
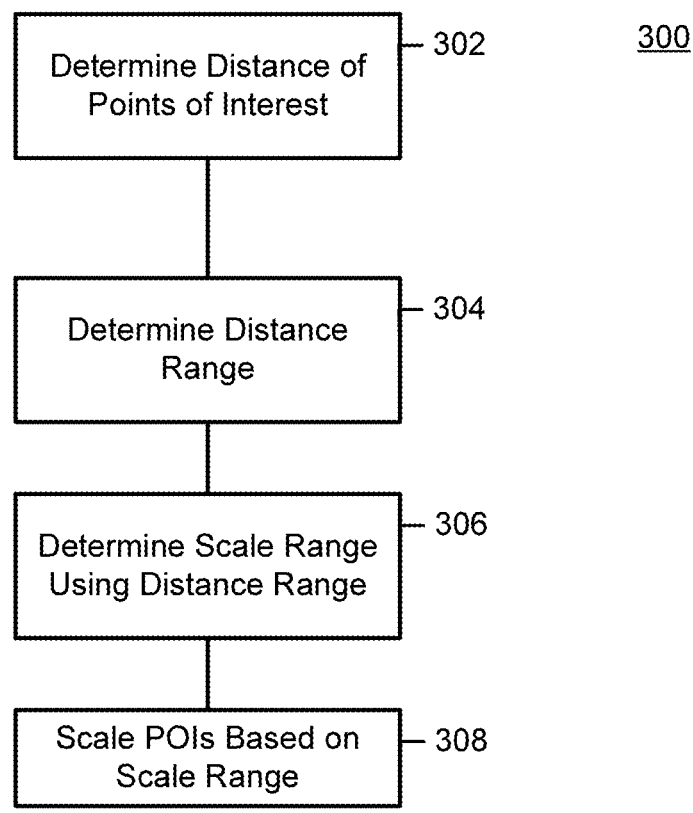
Figure 4:
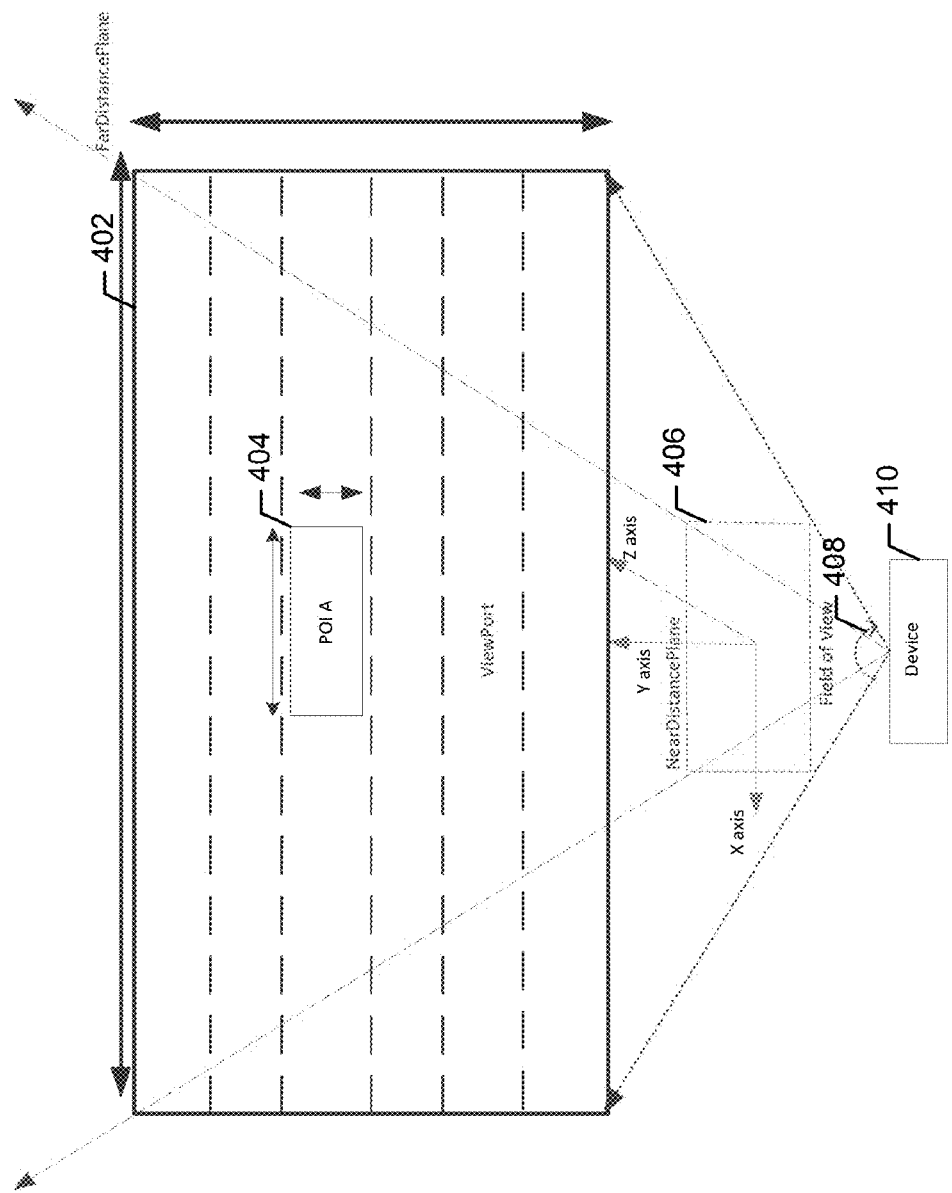
Figure 5:
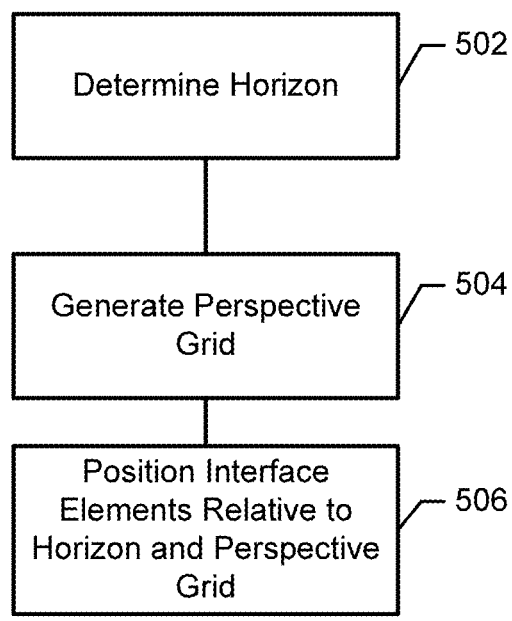
Figure 6:
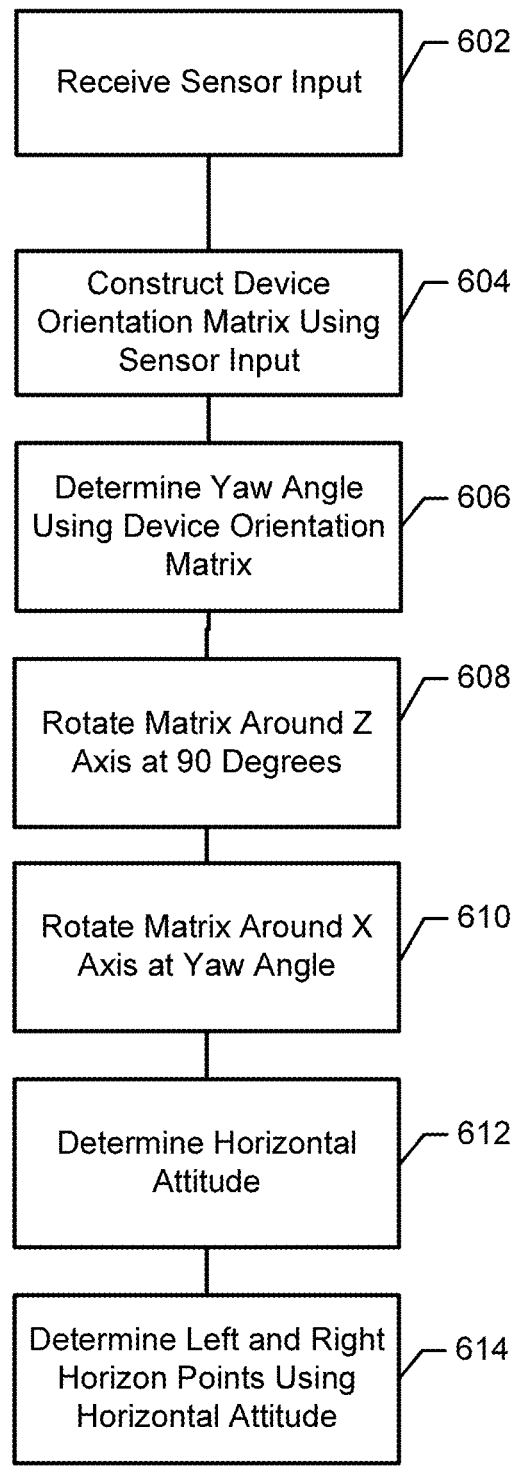
Figure 7:
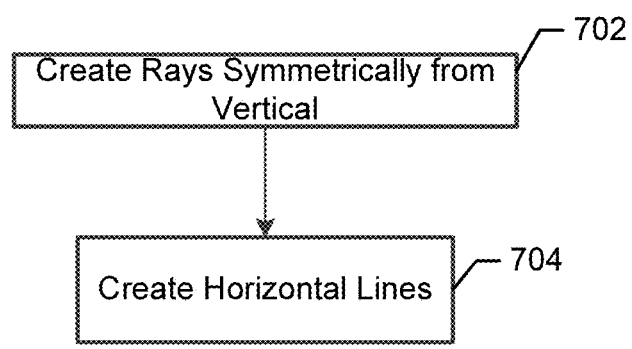
Figure 8:
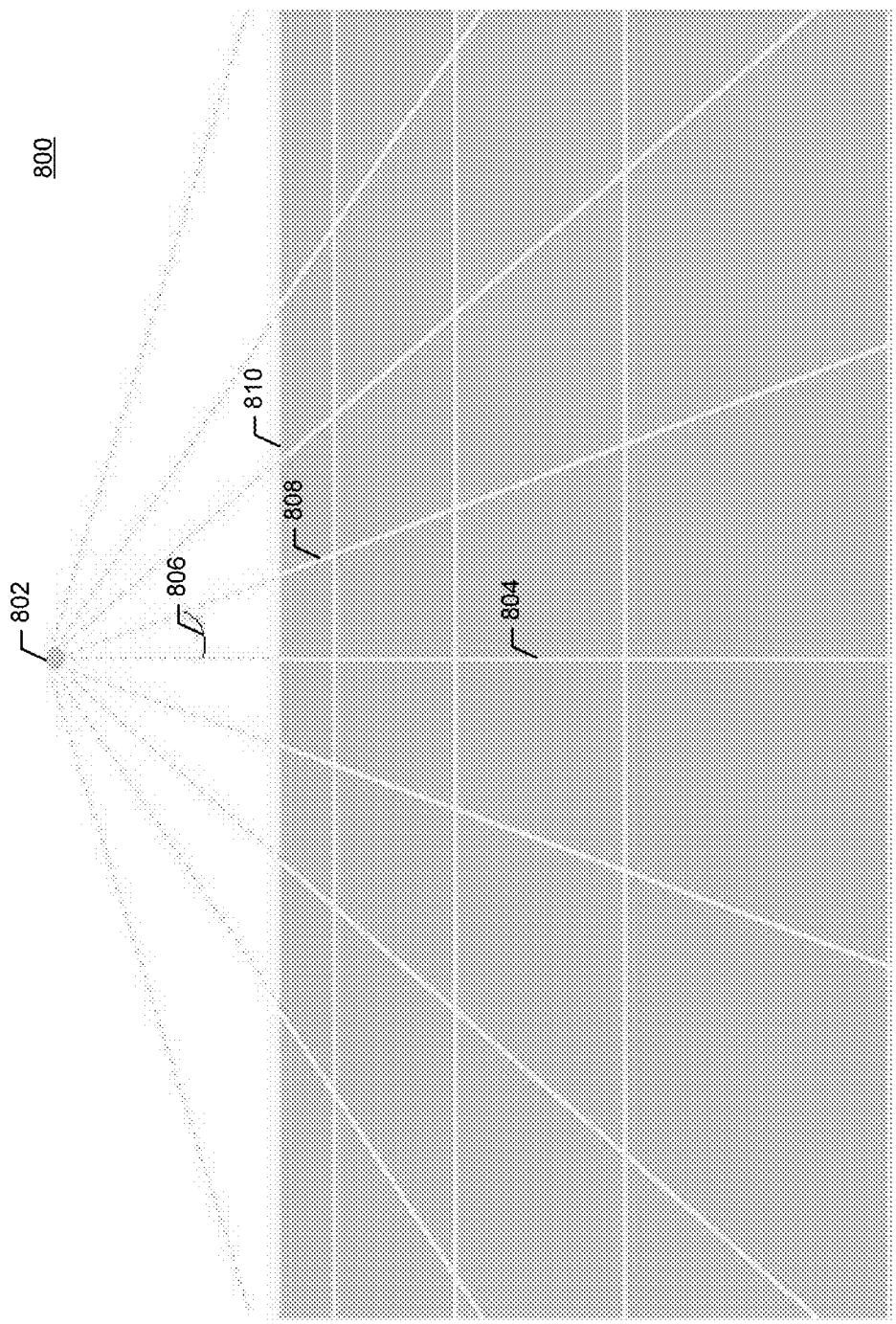
Figure 9:
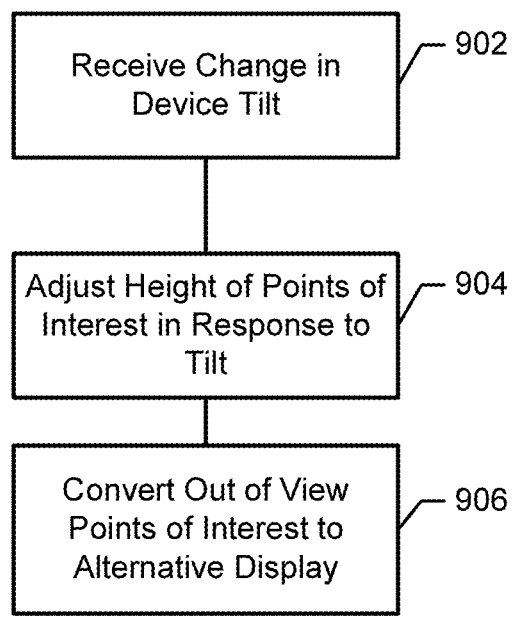
Figure 10:
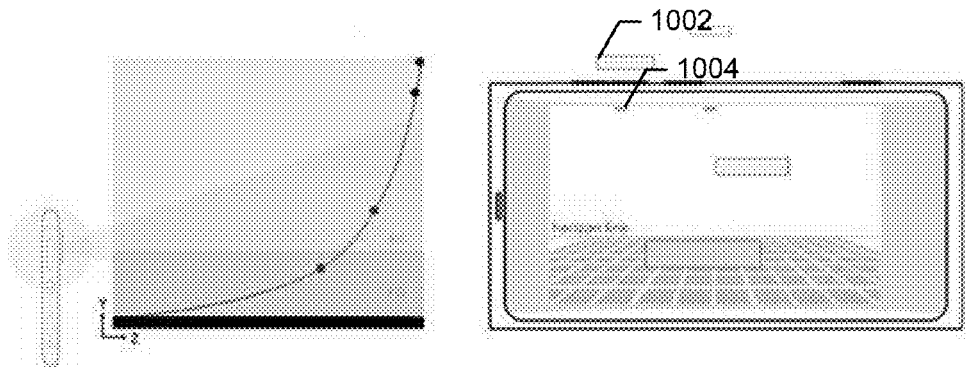
Figure 11:
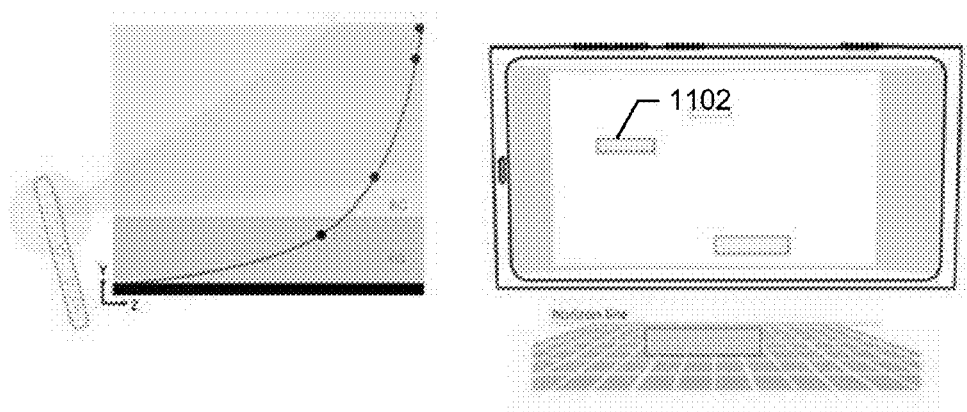
Figure 12:
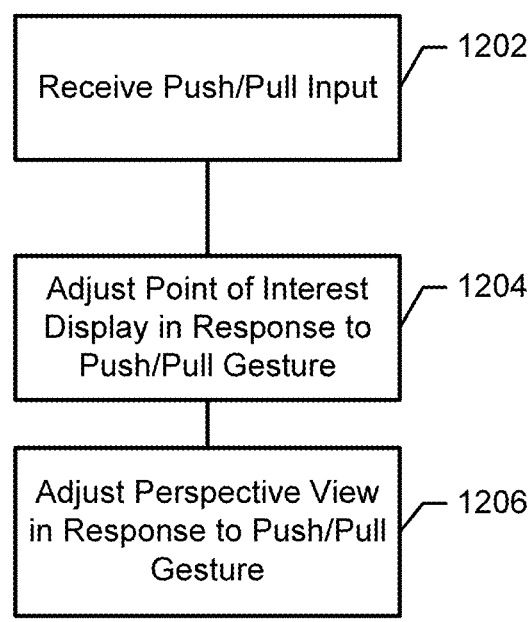
Figure 13:
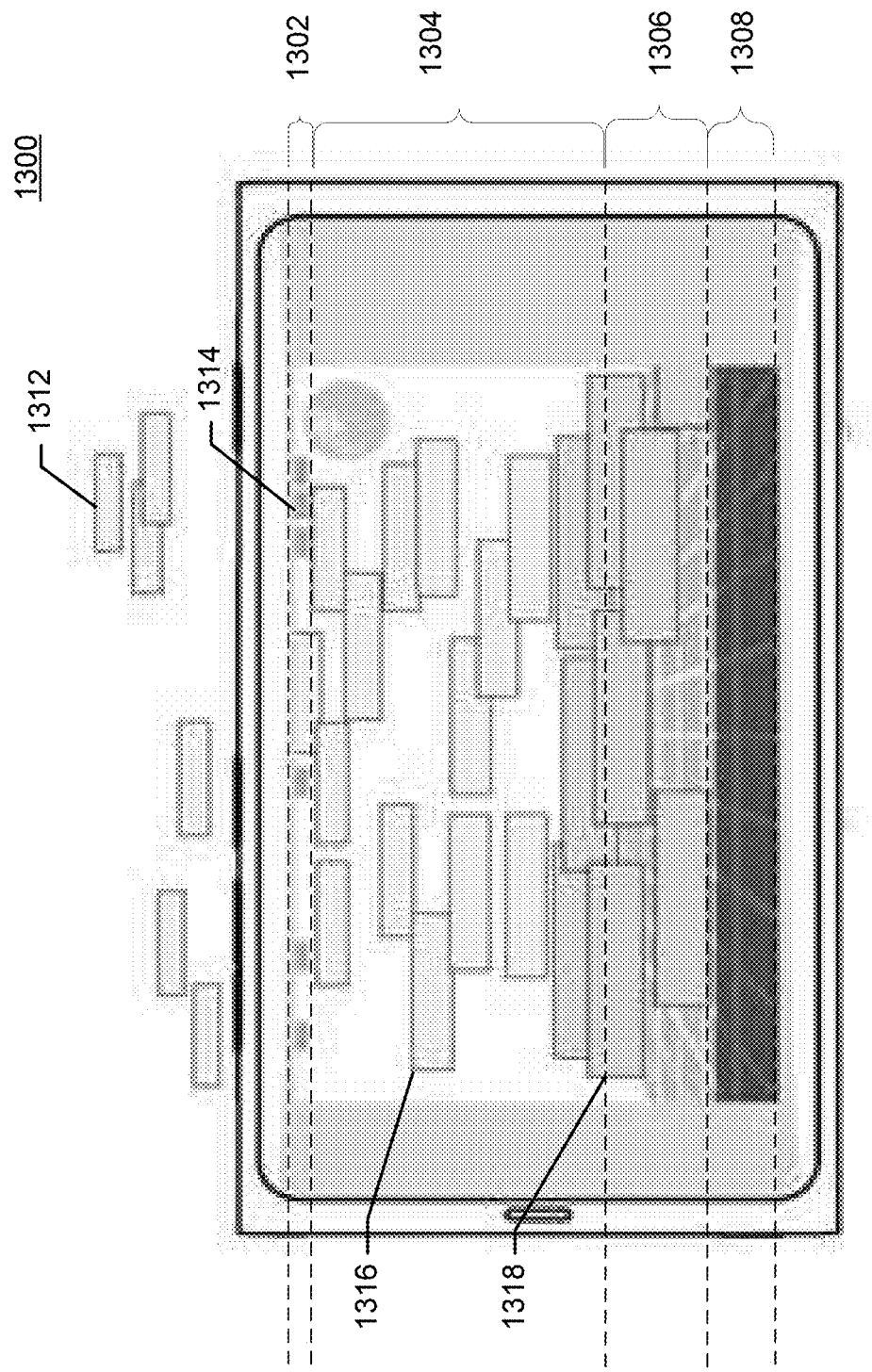

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment of the present invention;

FIG. 2 is a flow diagram depicting an example of a method for placing an interface element in an AR interface in accordance with an example embodiment of the present invention;

FIG. 3 is a flow diagram depicting an example of a method for scaling a point of interest in an AR interface;

FIG. 4 is a schematic diagram illustrating an example of a view port in accordance with an example embodiment of the present invention;

FIG. 5 is a flow diagram depicting an example of a method for adding virtual display elements to an AR interface in accordance with an example embodiment of the present invention;

FIG. 6 is a flow diagram depicting an example of a method for determining a horizon for an AR interface in accordance with an example embodiment of the present invention;

FIG. 7 is a flow diagram depicting an example of a method for generating a perspective grid for an AR interface in accordance with an example embodiment of the present invention;

FIG. 8 is a schematic diagram illustrating a perspective grid in an AR interface in accordance with an example embodiment of the present invention;

FIG. 9 is a flow diagram depicting an example of a method for modifying an AR interface using a device tilt in accordance with an example embodiment of the present invention;

FIG. 10 is a schematic diagram depicting an example of a first tilt operation in accordance with an example embodiment of the present invention;

FIG. 11 is a schematic diagram depicting an example of a second tilt operation in accordance with an example embodiment of the present invention;

FIG. 12 is a flow diagram depicting an example of a method for processing a push/pull input to modify an AR interface in accordance with an example embodiment of the present invention; and FIG. 13 is a schematic diagram depicting an AR interface in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment of the present invention in order to display an AR interface on a display device, such as a display device coupled to a mobile terminal. In this regard, a method, apparatus and computer program product of an example embodiment may preprocess one or more interface elements to estimate locations of the interface elements on a display. The data generated by the preprocessing may be used to identify overlapping interface elements and to optimize clustering of interface elements. Generation of the AR interface may further include identifying a horizon and projecting the horizon as part of the AR interface. A perspective grid may be drawn on the horizon to assist with depth perception and aid the user in visualization of the points of interest presented in the AR interface. The AR interface may further provide interactivity via device sensors, such as a tilt sensor or a touch screen.

The area of the three dimensional representation that is displayed may correspond to a physical position and/or orientation of the mobile terminal in space. In some of the embodiments, the overlaid image may be generated by receiving data over a network. The received data may correspond to a particular physical location of the mobile terminal, a particular query initiated by a user of the mobile terminal, or any other relevant data capable of being displayed as part of an AR interface.

The system of an embodiment of the present invention may include an apparatus 100 as generally described below in conjunction with FIG. 1 for performing one or more of the operations set forth by FIGS. 2-13 and also described below. In this regard, the apparatus 100 may be embodied by a mobile terminal. In this embodiment, the mobile terminal may be in communication with a display and/or a data network, either directly, such as via a wireless or wireline connection, or indirectly via one or more intermediate computing devices. In this regard, the display and the mobile terminal may be parts of the same system in some embodiments. However, the apparatus 100 may alternatively be embodied by another computing device that is in communication with the display and the mobile terminal, such as via a wireless connection, a wireline connection or the like. For example, the apparatus may be a mobile telephone, a personal digital assistant (PDA), a pager, a laptop computer, a tablet computer or any of numerous other hand held or portable communication devices, computation devices, content generation devices, content consumption devices or combinations thereof.

It should also be noted that while FIG. 1 illustrates one example of a configuration of an apparatus 100 for generating an AR interface, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 1, the apparatus 100 for displaying points of interest in an AR interface in accordance with one example embodiment may include or otherwise be in communication with one or more of a processor 102, a memory 104, a communication interface 106, a user interface 108, a camera 110 and a sensor 112. In some embodiments, the processor (and/or co-processors or any other processing circuitry assisting or otherwise associated with the processor) may be in communication with the memory device via a bus for passing information among components of the apparatus. The memory device may include, for example, a non-transitory memory, such as one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

In some embodiments, the apparatus 100 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 102 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 102 may be configured to execute instructions stored in the memory device 104 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 106 may be any means such as a device or circuitry embodied in either hardware or a combination of hardware and software that is configured to receive and/or transmit data from/to a network and/or any other device or module in communication with the apparatus 100, such as by supporting communications with a display and/or a mobile terminal. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The apparatus 100 may include a user interface 108 that may, in turn, be in communication with the processor 102 to provide output to the user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms. In one embodiment, the display of the apparatus may be embodied by a liquid crystal display (LCD) screen presented on one surface of the mobile terminal. For example, in an instance in which the display is an LCD screen embodied on one surface of the mobile terminal, the AR interface may be displayed on the screen for viewing by and interacting with the user of the mobile terminal. As the mobile terminal moves in physical space and visual input provided to the mobile terminal changes, the AR interface displayed on the screen may be updated in a corresponding manner. The processor 102 may comprise user interface circuitry configured to control at least some functions of one or more user interface elements such as a display and, in some embodiments, a speaker, ringer, microphone and/or the like. The processor 102 and/or user interface circuitry comprising the processor 102 may be configured to control one or more functions of one or more user interface elements through computer program instructions (e.g., software and/or firmware) stored on a memory accessible to the processor (e.g., memory 104, and/or the like).

In some example embodiments, the apparatus 100 may include an image capturing element, such as a camera 110, video and/or audio module, in communication with the processor 102. The image capturing element may be any means for capturing an image, video and/or audio for storage, display or transmission. For example, in an example embodiment in which the image capturing element is a camera, the camera may include a digital camera capable of forming a digital image file from a captured image. As such, the camera may include all hardware (for example, a lens or other optical component(s), image sensor, image signal processor, and/or the like) and software necessary for creating a digital image file from a captured image. Alternatively, the camera may include only the hardware needed to view an image, while a memory device 104 of the apparatus stores instructions for execution by the processor in the form of software necessary to create a digital image file from a captured image. In an example embodiment, the camera 110 may further include a processing element such as a co-processor which assists the processor 102 in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

As shown in FIG. 1, the apparatus 100 may also include one or more sensors 112, such as a location information receiver (e.g., a GPS receiver), an accelerometer, a gyroscope, a compass, or the like, that may be in communication with the processor 102 and may be configured to determine the location of the apparatus and to detect changes in motion and/or orientation of the apparatus.

The method, apparatus 100 and computer program product may now be described in conjunction with the operations illustrated in FIGS. 2-13. In this regard, the apparatus may include means, such as the processor 102, the camera 110 or the like, for displaying points of interest in an AR interface. The processor 102 may perform use point of interest (POI) data in conjunction with input from one or more of the sensors 112 to display points of interest via a display in an efficient and visually pleasing manner. The processor 102 may process the locations of one or more of the points of interest to optimize placement of the POIs, such as by projecting the points of interest onto a cylinder, and deriving three dimensional coordinates based on the position of the POIs on the cylinder. The processor 102 may further determine interface elements, such as a perspective grid or a horizon location, to assist with display of the points of interest in the AR interface.

FIG. 2 is a flow diagram depicting an example of a method 200 for placing an interface element in an AR interface in accordance with an example embodiment of the present invention. The method 200 is operable to create an efficient and aesthetically pleasing user interface to receive information about one or more points of interest in an AR environment. The method 200 may determine the location of points of interest as they would be displayed in the AR environment, and arrange and/or cluster the interface elements to ensure that the interface elements are efficiently presented to a user. The method 200 may further determine one or more elements of the interface that are not related to display of the points of interest, such as, for example, a horizon line or a perspective grid. These non-POI elements may assist the user with viewing and/or interacting with the AR interface.

Points of interest are typically associated with geographic coordinates to provide a common location reference system. For example, a POI may be identified as being at a particular set of latitude and longitude coordinates and/or elevation data, or at a particular location defined by a polar coordinate system. At action 202, geographic coordinates may be identified for one or more points of interest to be displayed in an AR interface. For example, an application executing on the mobile terminal may receive sensor data (e.g., global positioning system data) to identify the location of the mobile terminal. The mobile terminal may determine one or more points of interest proximate to the location of the mobile terminal. For example, the mobile terminal may query a POI database using the identified location of the mobile terminal, and the POI database may provide one or more points of interest proximate to the location. Points of interest may also be associated with metadata, indicating other attributes of the POI. For example, points of interest may be associated with a name, an address, a phone number, and/or a type of POI. In some embodiments, the mobile terminal may request a particular category or type of points of interest (e.g., restaurants or shops) proximate to the current location, and the AR interface may be designed to display points of interest of the chosen category or type.

In order to display a POI in the AR interface, the mobile terminal may determine the location of the POI relative to the current position of the mobile terminal. This location may be determined at action 204, and expressed as polar coordinates with a bearing and distance value. In this regard, the geographic coordinates may be processed along with the geographic location of the mobile terminal in order to convert the geographic coordinates to positions in a three dimensional space relative to the mobile terminal. For example, a location expressed in polar coordinates may be converted to a location relative to the mobile terminal, or the relative coordinates of the POI may be converted into a distance and bearing relative to the location and bearing of the mobile terminal. For example, a conversion function may utilize conversion properties as specified by the World Geodetic System 84 (WGS84) standard coordinate frame. The WGS84 standard coordinate frame may provide the basis for a conversion function provided as part of an application programming interface (API). The conversion function may be performed according to the following equations:

$$\Delta X_m = (\lambda_s - \lambda_f) \quad \text{(Eq. 1)}$$

$$\Delta Z_m = (\rho_s - \rho_f) \quad \text{(Eq. 2)}$$

Where $\Delta X_m$ is the difference between the latitude of the mobile terminal, $\lambda_s$, and the latitude of the POI, $\lambda_f$, in meters, and $\Delta Z_m$ is the difference between the longitude of the mobile terminal, $\rho_s$, and the longitude of the POI, $\rho_f$, in meters. Once coordinates are established for the POI, the POI may be projected onto a cylinder representing the three dimensional space around the mobile terminal at action 206. The cylinder may be a unit cylinder, and each of the nearby points of interest may be projected onto the unit cylinder according to the distance and bearing of the POI relative to the mobile terminal as determined at action 202. For example, each POI may be associated with a bearing, $\Theta_A$, and a distance, $D_{fs}$, such as derived by the following equation:

$$\Theta_A = \text{ArcTan}(\Delta X_m, \Delta Z_m) \quad \text{(Eq. 3)}$$

where $X_m$ and $Z_m$ are the distance between the POI and the location of the mobile terminal along the North/South and East/West axes, respectively, and where $\Theta_A$ is an bearing with reference to North. The distance $D_{fs}$ may be derived by determining the actual distance in meters between the POI and the location of the mobile terminal in meters. The points of interest may be projected onto the circle that forms the base of the cylinder using the bearing angle to define an angle relative to north on the circle, and the height of the POI on the cylinder may correspond to the distance $D_{fs}$.

Once the points of interest have been projected onto the cylinder, the cylinder may be used to define the three dimensional world space around the mobile terminal. However, when displaying the AR interface, it is only appropriate to display those points of interest that the mobile terminal can actual see. As such, only a subset of the points of interest may be displayed at any given time. To identify whether particular points of interest from the cylinder should be displayed, view parameters for the mobile terminal may be determined at action 208. View parameters may include information such as the size (e.g., width and height) and shape of the device viewport, the horizontal and/or vertical pixel resolutions of the display, the aspect ratio of the display, the number of degrees in the field of vision of the view port, the width and/or height of a single pixel in degrees, the distance of a near or far plane of vision, or the like. These parameters may define which points of interest are visible in the AR world space defined by the cylinder populated at action 204. The viewport parameters are described further below with respect to FIG. 3.

At action 210, locations in three dimensional space may be determined for one or more of the POIs. In the cylindrical projection generated at action 206, POIs may be expressed as two coordinates: a bearing and a distance. However, in order to efficiently represent the POIs in a three dimensional matrix, the bearing and distance may be converted to a three dimensional coordinate system. The POI locations may be converted to a three dimensional format from the $(\Theta_A, D_{fs})$ representation via the following equations:

$$X_m = D_{fs} * \sin(\Theta_A) \quad \text{(Eq. 4)}$$

$$Y_m = H_c * S_n \quad \text{(Eq. 5)}$$

$$Z_m = D_{fs} * \cos(\Theta_A) \quad \text{(Eq. 6)}$$

where $X_m$, $Y_m$, and $Z_m$ are X, Y, and Z coordinates in a three dimensional Cartesian coordinate system, $H_c$ is a number of pixels of width of the view port, and $S_n$ is the scale value. By determining the location of the POIs in three dimensional space, a three dimensional model may be used to render the POIs in combination with a bearing of the mobile terminal, the cylindrical projection, and the view port defined by the view parameters.

Once the viewport, the cylinder, and the three dimensional model have been defined, points of interest may be displayed based on the direction in which the mobile terminal is facing. For example, the viewport may define a "slice" of the cylinder that is visible, and points of interest in that slice may be displayed in the AR interface at a location specified by the viewport settings (e.g., at pixels that map to the degree values which are visible to the mobile terminal). The slice of the cylinder that contains POIs to be displayed may be identified by determining the bearing of the mobile terminal at action 212. For example, the mobile terminal may process input from one or more sensors coupled to the mobile terminal (e.g., a compass, an accelerometer, and/or a gyroscope). The bearing of the mobile terminal may be used to define an angle with respect to north for the circle that makes up the bottom of the cylinder upon which the POIs are projected.

POIs that are within a particular angle of the bearing of the mobile terminal may be identified for display at action 214. The particular angle may be defined by the view angle of the view port, as defined in the display parameters. For example, if the frame of view of the view port is defined as 90 degrees, then POIs with a $\Theta_A$ value within 45 degrees to either side of the viewport may be identified as visible to the mobile terminal. POIs that are identified as visible may be rendered using the location information of the POI in the three dimensional model. In this manner, a single POI may include data representing the location of the POI in a geographic coordinate system (e.g., a geographic location of the POI), the location of the POI in a polar coordinate system (e.g., the location of the POI on the cylindrical projection), and the location of the POI in the three dimensional model (e.g., the three dimensional Cartesian location of the POI for rendering on the AR interface).

Various additional operations may be performed on the POI based on the location values of the POI. For example, the POI may be scaled in the display based on a distance of the POI. FIG. 3 is a flow diagram depicting an example of a method 300 for scaling a POI in an AR interface. The method 300 is operable to determine a scale value for one or more POIs to be displayed in an AR interface. The scale value may be related to the distance of the POI from the mobile terminal. Once determined, the scale value may be used to determine the relative size of an interface element associated with the POI. In some embodiments, POIs may be separated into foreground and background POIs based on distance, with different scaling rules applied to the foreground POIs and the background POIs. In this manner, POI interface elements may be scaled such that a user may be able to discern distance based solely upon the size of the POI.

At action 302, a distance for one or more POIs is determined. For example, the mobile terminal may determine a distance between a geographical location associated with the mobile terminal and a geographical location associated with the POI. The operation may be repeated for each POI, or a subset of all POIs. For example, distances, and thus scale values, may be computed for POIs that are currently visible based on the bearing of the mobile terminal. The distance may be determined via a processing means, such as the processor 102.

At action 304, a distance range for the set of POIs is determined. The distance range may define a distance between a nearest POI (e.g., the smallest distance value determined at action 302), and a farthest POI (e.g., the largest distance value determined at action 302). The distance range may be determined by a processing means, such as the processor 102.

At action 306, a scale range is determined using the distance range. To ensure that POIs are scaled properly, it may be appropriate to normalize the scale value for each POI based on the relationship of the distance of that POI to the distance range as determined at action 304. For example, one method of establishing a scale range to normalize the scale value is to divide the distance of each POI by the distance range value. The normalized distance value may be used to modify the scale value for a particular POI to ensure that the scale relationship remains consistent as distance between the POIs fluctuates. The scale range may be determined by a processing means, such as the processor 102 described with respect to FIG. 1.

At action 308, a scale value for one or more of the POIs may be determined using the scale range identified at action 306. The scale value allows for modifying the size of the POI in the AR interface to reflect the distance of the POI from the user. In some embodiments, different formulae may be used to determine the scale value for POIs in the foreground of the display than POIs in the background of the display. Whether a POI is in the foreground or background may be determined based on the distance of the POI from the user. The scale value for one or more of the POIs may be determined by a processing means, such as the processor 102 described with respect to FIG. 1.

FIG. 4 is a schematic diagram illustrating an example of a view port in accordance with an example embodiment of the present invention. As described with respect to FIG. 2, a view port may be defined to enable display of the POIs on the mobile terminal as interface elements of an AR interface. The view port 400 illustrates properties that may be defined for displaying the POIs on a display device.

The view port 400 may include a far distance plane 402, a near distance plane 406, and a field of view 408. The far distance plane 402 and the near distance plane 406 may define a closest and further view distance for POIs, respectively. The field of view 408 may be an angle of view corresponding to an angle of the circle at the base of the cylinder described with respect to FIG. 2. For example, a 90 degree field of view may represent a 90 degree arc of the circle. The field of view 408 may be defined out from a device 410, such as the mobile terminal, with the device 410 as the center of a circle and the field of view 408 representing an arc of the circle. The view port 408 may include multiple fields of view 408, such as a vertical field of view and a horizontal field of view.

The view port 400 may be mapped to a display of the device 410. The display may include a pixel width and height, which are mapped to the width and height of the view port 400. For example, each pixel may be associated with a certain number of degrees based on the field of view 408. The pixels may have a defined number of vertical and horizontal degrees per pixel based on the number of pixels in the display and the number of horizontal and vertical degrees.

The view port 400 may be used to display one or more interface elements 404 associated with a POI. The interface element 404 may have a width and height defined by a scale value as described with respect to FIG. 3, multiplied by a static value associated with POI interface elements.

FIG. 5 is a flow diagram depicting an example of a method 500 for adding virtual display elements to an AR interface in accordance with an example embodiment of the present invention. As described above with respect to FIG. 2, interface elements other than POIs may also be generated for use with the AR interface. Examples of these virtual interface elements include a horizon and a perspective grid. The horizon may function as a dividing feature of the display. For example, even though the horizon may not be displayed in the AR interface, a line defining the horizon may be used to control the display of POIs (e.g., POIs beyond a certain distance are displayed above the horizon) or other interface elements (e.g., as the top of a perspective grid). A perspective grid may present a series of lines leading up to a vanishing point to assist the user with visualization of the POIs in three dimensional space. The method 500 may be performed by a mobile terminal, such as the apparatus 100. The method may be executed by a processing means, such as the processor 102.

At action 502, a horizon is determined for the AR interface. The horizon may be determined using a series of sensors coupled to the mobile terminal, such as one or more of a compass, an accelerometer, or a gyroscope. An example method of identifying a horizon for an AR interface is described further below with respect to FIG. 6. The horizon may be determined via a processing means, such as the processor 102.

At action 504, a perspective grid may be generated for the AR interface. The perspective grid may be determined by identifying a vanishing point and drawing a series of rays to the vanishing point leading up to a horizon as determined at action 502. An example method for generating the perspective grid is described further below with respect to FIG. 7. The perspective grid may be generated by a processing means, such as the processor 102.

At action 506, interface elements may be placed relative to the horizon and/or perspective grid. The horizon may serve as a dividing line between interface elements. For example, interface elements may be associated with a particular height on the display in accordance with the distance of the POI associated with the interface element. If the distance results in a display of the POI above the horizon, then the POI may be identified as being a background POI, and/or the display of the interface element may be altered (e.g., by graying out the interface element or making the interface element transparent). POIs may be defined as placed in the foreground or the background of the display based on their location with respect to the horizon. For example, POIs that are displayed above the horizon may be indicated to be in the background of the display. POIs may be displayed in different manners depending upon whether they are located in the foreground or background. For example, background POIs may have different methods of calculating scale values (e.g., resulting in smaller POI interface elements). Similar actions may be performed relative to the perspective grid, or the perspective grid may be used primarily as a frame of reference for the user. The interface elements may be positioned relative to the horizon and/or perspective grid via a processing means, such as the processor 102.

FIG. 6 is a flow diagram depicting an example of a method 600 for determining a horizon for an AR interface in accordance with an example embodiment of the present invention. The method 600 is operable to determine a horizon location for a display of a mobile terminal by using one or more sensors coupled to the mobile terminal. For example, mobile terminals may commonly be coupled to various sensors such as compasses, accelerometers, and/or gyroscopes. These sensors may provide the mobile terminal with information about the mobile terminal's orientation in three dimensions. For example, these sensors may be used to identify a yaw, a pitch, and a roll of the mobile terminal. By using the yaw, pitch, and roll data, it is possible to identify the location of the horizon relative to the mobile terminal. The horizon may be determined by a mobile terminal, such as the apparatus 100. The method 600 may be performed by a processing means, such as the processor 102.

At action 602, the method 600 receives input from one or more sensors. The sensor input may be provided as a series of vectors. For example, the mobile terminal may receive sensor input from multiple accelerometers, representing the motion of the mobile terminal in different directions. The sensor data may be caused to be received by a processing means, such as the processor 102. Values from the device accelerometers may be used to populate a rotation matrix for the device yaw, pitch, and roll. The rotation matrix may take the following form:

TABLE 1

$$\begin{pmatrix} r_{11} & r_{12} & r_{13} \\ r_{21} & r_{22} & r_{23} \\ r_{31} & r_{32} & r_{33} \end{pmatrix}$$

where the values for r are provided by the accelerometers. Using such a rotation matrix, it is possible to derive the yaw, pitch, and roll for the mobile terminal using known matrix formulae.

At action 604, the mobile terminal may generate a device orientation matrix representing the motion vectors received from the accelerometers, with each accelerometer corresponding to an axis of movement (e.g., pitch, yaw, and roll). Representation of the acceleration vectors via a matrix allows for manipulation of the matrix to identify the orientation of the mobile terminal relative to the horizon, and thus a determination of the location of the horizon. The matrix may be generated from the sensor data via a processing means, such as the processor 102.

At action 606, the method 600 determines the yaw angle from the device orientation matrix. By determining the yaw angle, the method 600 may determine the orientation of the device with respect to the horizon. Thus, measurements received from the other sensors may be normalized based on the determined yaw angle for identification of the tilt of the mobile terminal relative to the horizon. The yaw angle may be determined by taking the arctangent of a vector associated with a yaw accelerometer such as, for example, the following formula:

$$\gamma = \tan^{-1} \frac{r_{32}}{r_{33}} \quad \text{(Eq. 7)}$$

where $r_{32}$ and $r_{33}$ are terms in the device orientation matrix and $\gamma$ is the yaw angle of the mobile terminal. The yaw angle may be determined by a processing means, such as the processor 102.

At action 608, the method 600 may derive a Z normalized device orientation matrix by rotating the device orientation matrix by 90 degrees about the Z axis. For example, the device orientation matrix may be multiplied by a rotation matrix corresponding to a 90 degree rotation about the Z axis. Rotating the device orientation matrix by 90 degrees about the Z axis results to create a matrix that, when multiplied by a matrix rotated by the yaw angle about the X axis, provides an attitude of the mobile terminal relative to the horizon. The rotation about the Z axis may serve to map the matrix into a three dimensional world space. The Z axis rotation may be performed by a processing means, such as the processor 102.

At action 610, the method 600 may derive an X normalized device orientation matrix by rotating the device orientation matrix by the yaw angle around the X axis. For example, the device orientation matrix may be multiplied by a rotation matrix corresponding to the yaw angle rotation about the X axis. When projecting the matrix into the three dimensional world space, points associated with the horizon may vary depending upon the orientation of the device. For example, if the device is tilted to one side or another at the yaw angle, it is necessary to account for this yaw angle prior to identifying the horizon. As such, by rotating the matrix about the X axis by the yaw angle, this allows the variation of the horizon to be tracked and properly accounted for. The X axis rotation may be performed by a processing means, such as the processor 102.

At action 612, the method 600 determines a horizontal attitude (e.g., the height of the horizon relative to the display of the mobile terminal) for the mobile terminal by performing matrix multiplication on the matrices derived at actions 608 and 610. The result of the matrix multiplication operation is an attitude of the mobile terminal relative to the horizon. The attitude may be derived by a processing means, such as the processor 102.

At action 614, the horizon is derived using the attitude of the mobile terminal. Once the attitude has been determined, the mobile terminal may identify a leftmost point visible in the view port at the height defined by the attitude and a rightmost point visible in the view port at the height defined by the attitude. The horizon may be formed by drawing a line between the leftmost and rightmost points thus identified. The horizon may be stored by the mobile device as the line between the two points. The horizon may be derived by a processing means, such as the processor 102.

FIG. 7 is a flow diagram depicting an example of a method 700 for generating a perspective grid for an AR interface in accordance with an example embodiment of the present invention. The perspective grid may present a series of rays drawn towards a vanishing point (e.g., representing a vanishing point straight ahead to infinity) to illustrate a perspective view to a user. The perspective grid may be drawn out to the horizon, depending upon the determination of the location of the horizon as described above with respect to FIG. 6.

At action 702, rays may be drawn symmetrically relative to a center vertical ray. The center ray may be drawn from a vanishing point at the center of the top of the display straight vertical to the bottom of the display. The symmetrical rays may be drawn at particular angles relative to the center line such as, for example, every 5 degrees, every 10 degrees, or every 30 degrees to the left and right of the center ray. The rays may not be drawn above the horizon to show proper perspective.

At action 704, horizontal grid lines may be drawn across the rays drawn at action 702. The horizontal grid lines may be offset at particular intervals with respect to the bottom of the view port, up to a height equal to the horizon. The height of the horizontal lines relative to the screen may be determined based on the ratio of the length of the center ray to the horizontal line compared to the length of the first ray to the right or left of the line, such that the distance for the horizontal line is equal to the distance of the previous line multiplied by 1 minus the tangent of the angle between the center ray and the next ray to the right or left of center, such that the distance is the following equation:

$$D_{n+1} = D_n * (1 - \tan(\theta)) \quad \text{(Eq. 8)}$$

where $D_{n+1}$ is the distance of the next horizontal line to the top of the screen, $D_n$ is the distance of the current horizontal line to the top of the screen, and $\theta$ is the angle between the center ray and the next nearest ray. The location of the horizontal lines may be determined via a processing means, such as the processor 102.

FIG. 8 illustrates a perspective grid 800 as drawn according to the method 700. As described with respect to FIG. 7, the perspective grid 800 shows the user a representation of perspective in a three dimensional environment. The perspective grid 800 may be drawn as a series of rays emanating from a vanishing point 802 to illustrate perspective into the distance. The rays may be drawn relative to a center ray 804 pointing from the vanishing point to the bottom center of the display. Symmetrical rays 808 may be drawn out from the center ray 804 at a ray angle 806 relative to the center ray 804. Each of the rays 808 may emanate from the vanishing point at a particular ray angle 806. Rays may not be drawn above the horizon 810 to illustrate how objects disappear into the horizon.

FIG. 9 is a flow diagram depicting an example of a method 900 for modifying an AR interface using a device tilt in accordance with an example embodiment of the present invention. Interface elements may be positioned at a particular height in the AR display based on the distance of the POI to the mobile terminal. For example, POIs that are further away may be displayed higher in the display. POIs that are beyond a certain distance threshold may not be displayed due to the fact that the coordinate of the POI associated with the height in the display is not visible based on the view port settings of the mobile terminal. Alternatively, POIs that are out of the view port may be represented as a smaller "scent" icon. By tilting the mobile terminal, the user may bring these POIs into the view port, thus converting the icons from the scent icons to a standard interface element. The method 900 is operable to control the display of POIs using the device tilt.

At action 902, the method 900 receives a change in tilt of the mobile terminal, such as from one or more sensors coupled to the mobile terminal. The change in tilt may be received via a processing means, such as a processor 102.

At action 904, display of the POI interface elements may be adjusted based on the change in tilt. For example, the change in tilt may result in an alteration of the view angle of the device, bringing interface elements into view that would normally be too high for display. Interface elements may maintain their position relative to the horizon line. Whether a particular interface element is visible may depend upon the height of the interface element in the three dimensional representation (see FIG. 2), based on the distance of the POI associated with the interface element from the user's current location. The POI interface elements may be adjusted by a processing means, such as a processor 102.

At action 906, interface elements that are no longer visible in the main viewing area may be converted to an alternate representation. As POIs are no longer present in the display, the interface elements associated with those POIs may be converted to a different size or shape icon. For example, as POIs exit the primary viewing area due to a tilt operation, they may be replaced by smaller icons to avoid occluding the primary viewing area. Alternately, as interface elements associated with smaller icons enter the main viewing area, they may be replaced with larger icons. The interface elements may be converted to alternate representations by a processing means, such as a processor 102.

FIGS. 10 and 11 are schematic diagrams illustrating the results of a tilt operation performed by a mobile terminal, such as a tilt operation as described with respect to FIG. 9. FIG. 10 illustrates a first position where the mobile terminal is level with the horizon. The display in FIG. 10 illustrates how interface elements projected above the display, such as the interface element 1002, may be shown as small "scent" icons, such as the icon 1004. As the mobile terminal is tilted upward in FIG. 11, the scent icon 1004 is replaced with a full size icon 1102.

FIG. 12 is a flow diagram depicting an example of a method 1200 for processing a push/pull input to modify an AR interface in accordance with an example embodiment of the present invention. The method 1200 is operable to process a "push" or "pull" input from a user to alter display of POIs in an AR interface. The terms "push" and "pull" may be used to represent a user input whereby the user selects a portion of the display and indicates they wish to move forward "into" the screen (e.g., a push movement) or backward "out" of the screen (e.g., a pull movement). Such movements may typically be performed by selecting a portion of a perspective grid with a cursor or touch screen movement and moving the cursor or touch screen input up for a push movement or down for a pull movement. Such movements may be processed by the method 1200 as intending to move the view of the AR interface forward into or backward out of the screen relative to the user.

At action 1202, the method 1200 receives the push or pull gesture movement. As described above, such a gesture may be performed using a cursor or touch screen. The push or pull gesture may be received by a processing means, such as a processor 102.

At action 1204, the POI display may be adjusted based on the gesture. For example, the method 1200 may process a push gesture to move the viewpoint of the user "into" the screen, adjusting the displayed POIs to show POIs that would be visible if the user were to move forward relative to the screen. A pull gesture may be processed to move the viewpoint of the user "out" of the screen, to show POIs that might be visible to the user if the user were to walk backwards relative to the screen. The POI display may be adjusted by a processing means, such as a processor 102.

At action 1206, the perspective view may be adjusted based on the gesture. As described above with respect to FIGS. 7 and 8, a perspective grid may be used in the AR interface to provide a sense of perspective and scale to the user. As the viewpoint of the user changes in response to the push/pull gesture, the perspective grid may be updated to reflect the change in viewpoint. For example, the perspective grid may scroll forward or back along with the view point. In some embodiments, the perspective grid may be stretched or compressed according to the distance the viewpoint is adjusted, such that horizontal lines in the grid are compressed closer together as the user's viewpoint moves into the screen, and the distance between horizontal lines is increased if the user's viewpoint moves out of the screen.

FIG. 13 is a schematic diagram depicting an AR interface 1300 in accordance with an example embodiment of the present invention. The AR interface 1300 may include several distinct areas for display of interface elements associated with POIs, with different display rules for the interface element based on the portion of the AR interface in which the element is displayed. By using distance to determine the height of the interface element in the AR interface 1300 and the height of the interface element to determine the area of the AR interface 1300, display rules may be applied to interface elements based on distance. In this manner, POIs located at similar distances may be displayed in similar ways.

The AR interface 1300 may be divided into four areas, including a scent area 1302, a background area 1304, a foreground area 1306, and an out of bounds area 1308. The scent area 1302 may include alternate representations of POIs that are too far away for display in the standard view port. For example, an interface element 1312 may be replaced with a scent icon 1314 because the interface element 1312 is too far away for display in the main view port of the AR interface. As described with respect to FIGS. 10 and 11, tilting the mobile terminal may bring these POIs into view such that the scent interface element may be replaced with a full size icon.

The AR interface 1300 may further include a background area 1304 and a foreground area 1306 for displaying POI interface elements. Whether an interface element is located in the foreground or background may be determined based on the distance of the POI, with POIs that are less than a threshold distance displayed in the foreground and other POIs displayed in the background or as scent icons. Different display rules may be applied to interface elements in the foreground and background. For example, a background interface element 1316 may be displayed smaller or faded compared to a foreground interface element 1318. The AR interface 1300 may also include an out of bounds area 1308, where interface elements are not displayed such as, for example, to preserve space for application interface controls.

The AR interface 1300 may provide a variety of ways for the user to interact with the display of the POI interface elements. As described above, more distant POIs may be displayed when the user tilts the mobile terminal at an upward angle, and closer POIs may be pushed down to the bottom of the display. The user may perform push or pull gestures to bring distant POI interface elements closer or to move closer POIs to the out of bounds area so they are no longer displayed. The perspective grid may be animated showing the direction of the push/pull gesture. In some embodiments, the grid may only be displayed when a push or pull gesture is ongoing.

The AR interface 1300 may further provide for scaling of interface elements over distance, as described above with respect to FIG. 3. POI interface elements may also have increased transparency as distance increases. For example, close POI interface elements may be completely opaque while transparency for further POIs increases with distance.

POI interface elements may be configured to overlap in three dimensional space in such a manner so that POI names or titles are always displayed. The "always-visible" area of the POI may be defined based on a starting (x, y) coordinate and vertical and horizontal offsets from the starting coordinate.

POI interface elements may be presented as a cluster when they share the same geolocation or if there is a visual vertical or horizontal overlap that falls above a certain overlap threshold. Selecting a cluster of POI interface elements may expand the cluster, and performing a selection operation elsewhere may close the cluster.

It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   determining a first location, the first location corresponding to the location of a mobile terminal;
   receiving a second location, the second location corresponding to the location of a point of interest;
   determining, using a processor, a bearing angle and a distance from the mobile terminal to the point of interest using the first location and the second location;
   projecting the point of interest onto a cylinder using the bearing and distance;
   determining a set of three dimensional coordinates in a Cartesian space for the point of interest relative to the mobile terminal using the projected point of interest;
   causing the point of interest to be displayed as an interface element of an augmented reality interface using the set of three dimensional coordinates in a Cartesian space;
   segmenting the augmented reality interface into at least a foreground region and a background region;
   determining whether the point of interest is displayed in the foreground region or the background region at least in part based on the distance from the mobile terminal to the point of interest, such that the point of interest is displayed in the background region if the distance is greater than a threshold;
   applying a first interface effect to the point of interest in response to the point of interest being displayed in the foreground region; and
   applying a second interface effect different from the first interface effect to the point of interest in response to the point of interest being displayed in the background region.

2. The method of claim 1, further comprising:
   determining a heading of the mobile terminal; and
   using the heading to determine whether the point of interest is visible in a display of the mobile terminal prior to displaying the point of interest.

3. The method of claim 1, further comprising:
   determining one or more view port settings for displaying a portion of the cylinder on a display of the mobile terminal; and
   using the one or more view port settings to display a portion of the cylinder including the point of interest on the display.

4. The method of claim 3, wherein the view port settings comprise at least one of a view port width in pixels, a view port height in pixels, a horizontal view port camera angle of view, and a vertical view port camera angle of view.

5. The method of claim 3, wherein the view port settings define the portion of the cylinder that corresponds to the viewing angle of a camera coupled to the mobile terminal.

6. The method of claim 1, further comprising scaling the interface element based on the distance from the mobile terminal to the point of interest associated with the interface element.

7. The method of claim 1, further comprising:
   determining a horizon based on input from one or more attitude sensors coupled to the mobile terminal; and
   adjusting display of the point of interest based on the location of the point of interest relative to the horizon.

8. The method of claim 1, wherein the height of the point of interest on the cylinder is based on the distance between the point of interest and the mobile terminal.

9. An apparatus comprising at least one processor and at least one memory including computer program instructions, the at least one memory and the computer program instructions configured to, with the at least one processor, cause the apparatus at least to:
   determine a first location;
   receive a second location, the second location corresponding to the location of a point of interest;
   determine a bearing angle and a distance from the apparatus to the point of interest using the first location and the second location;
   project the point of interest onto a cylinder using the bearing and distance;
   determine a set of three dimensional coordinates in a Cartesian space for the point of interest relative to the apparatus using the projected point of interest;
   cause the point of interest to be displayed as an interface element of an augmented reality interface using the set of three dimensional coordinates in a Cartesian space
   segment the augmented reality interface into at least a foreground region and a background region;
   determine whether the point of interest is displayed in the foreground region or the background region at least in part based on the distance from the mobile terminal to the point of interest, such that the point of interest is displayed in the background region if the distance is greater than a threshold;
   apply a first interface effect to the point of interest in response to the point of interest being displayed in the foreground region; and
   apply a second interface effect different from the first interface effect to the point of interest in response to the point of interest being displayed in the background region.

10. The apparatus of claim 9, further configured to:
    determine a heading of the apparatus; and
    determine, using the heading, whether the point of interest is visible in a display of the apparatus prior to displaying the point of interest.

11. The apparatus of claim 9, wherein the apparatus is further configured to:
    determine one or more view port settings for displaying a portion of the cylinder on a display of the apparatus; and
    use the one or more view port settings to display a portion of the cylinder including the point of interest on the display.

12. The apparatus of claim 11, wherein the view port settings comprise at least one of a view port width in pixels, a view port height in pixels, a horizontal view port camera angle of view, and a vertical view port camera angle of view.

13. The apparatus of claim 11, wherein the view port settings define the portion of the cylinder that corresponds to the viewing angle of a camera coupled to the apparatus.

14. The apparatus of claim 9, wherein the apparatus is further configured to scale the interface element based on the distance from the apparatus to the point of interest associated with the interface element.

15. The apparatus of claim 9, wherein the apparatus further comprises one or more attitude sensors and wherein the apparatus is further configured to:
    determine a horizon based on input from one or more attitude sensors coupled to the mobile terminal; and
    adjust display of the point of interest based on the location of the point of interest relative to the horizon.

16. The apparatus of claim 9, wherein the height of the point of interest on the cylinder is based on the distance between the point of interest and the apparatus.

17. A computer program product comprising at least one non-transitory computer-readable storage medium bearing computer program instructions embodied therein for use with a computer, the computer program instructions comprising program instructions configured to:
  determine a first location, the first location corresponding to the location of a mobile terminal;
  receive a second location, the second location corresponding to the location of a point of interest;
  determine a bearing angle and a distance from the mobile terminal to the point of interest using the first location and the second location;
  project the point of interest onto a cylinder using the bearing and distance;
  determine a set of three dimensional coordinates in a Cartesian space for the point of interest relative to the mobile terminal using the projected point of interest;
  cause the point of interest to be displayed as an interface element of an augmented reality interface using the set of three dimensional coordinates in a Cartesian space;
  segment the augmented reality interface into at least a foreground region and a background region;
  determine whether the point of interest is displayed in the foreground region or the background region at least in part based on the distance from the mobile terminal to the point of interest, such that the point of interest is displayed in the background region if the distance is greater than a threshold;
  apply a first interface effect to the point of interest in response to the point of interest being displayed in the foreground region; and
  apply a second interface effect different from the first interface effect to the point of interest in response to the point of interest being displayed in the background region.

18. The computer program product of claim 17, wherein the program instructions are further configured to:
  determine a heading of the mobile terminal; and
  use the heading to determine whether the point of interest is visible in a display of the mobile terminal prior to displaying the point of interest.

19. The computer program product of claim 17, wherein the program instructions are further configured to:
  determine one or more view port settings for displaying a portion of the cylinder on a display of the mobile terminal; and
  use the one or more view port settings to display a portion of the cylinder including the point of interest on the display.

20. The computer program product of claim 19, wherein the view port settings comprise at least one of a view port width in pixels, a view port height in pixels, a horizontal view port camera angle of view, and a vertical view port camera angle of view.

* * * * *